United States Patent [19]
Eaton

[11] Patent Number: 5,778,193
[45] Date of Patent: Jul. 7, 1998

[54] MULTI-NODE DATA PROCESSING SYSTEM

[75] Inventor: John Richard Eaton, Salford, England

[73] Assignee: International Computers Limited, London, England

[21] Appl. No.: 617,609

[22] Filed: Mar. 19, 1996

[30] Foreign Application Priority Data

Mar. 24, 1995 [GB] United Kingdom .................. 9506765

[51] Int. Cl.$^6$ ................................................. G06F 15/177
[52] U.S. Cl. ........................................................ 395/200.81
[58] Field of Search .................. 395/200.36, 200.37, 395/200.41, 200.42, 200.43, 200.46, 200.48, 200.5, 200.53, 200.56, 200.61, 200.62, 200.81; 370/224, 222, 223, 249

[56] References Cited

U.S. PATENT DOCUMENTS

| | | | |
|---|---|---|---|
| 4,530,085 | 7/1985 | Hamada et al. | 370/224 |
| 4,769,807 | 9/1988 | Niwa et al. | 370/224 |
| 5,105,188 | 4/1992 | Jung et al. | 370/224 |
| 5,159,595 | 10/1992 | Flanagan | 370/85.15 |
| 5,442,620 | 8/1995 | Kremer | 370/224 |

*Primary Examiner*—James P. Trammell
*Attorney, Agent, or Firm*—Lee, Mann, Smith, McWilliams, Sweeney & Ohlson

[57] ABSTRACT

A data processing system comprises a number of processing nodes interconnected by a data transmission network. The network is "hairpin" shaped, having a first leg, a second leg, and a loopback connection connecting the first leg to the second leg. Each node sends public write messages on to the first leg, and receives messages from the second leg. All the messages flow through the loopback connection, which thus serves as a central chronology point for the system, defining a unique chronological order for the messages. The network can be reconfigured, to split it into a number of subnetworks, each with first and second legs interconnected by a loopback connection. The system may include a backup node, for disaster recovery, situated at a very long distance from the processing nodes.

7 Claims, 3 Drawing Sheets

5,778,193

MULTI-NODE DATA PROCESSING SYSTEM

BACKGROUND OF THE INVENTION

This invention relates to multi-node data processing systems. More specifically, the invention is concerned with a network for interconnecting the processing nodes of such a system.

In one type of multi-node data processing system, each processing node has a local memory which holds a local copy of shared public data. When one processing node wishes to update the shared public data, it transmits a public write message to all the nodes (including itself), requesting them to update their local copies. To ensure coherency of the public data, it is necessary that all the nodes receive the public write messages in exactly the same sequence. The sequence of the public write messages defines a globally unique chronology for the updates.

One way of ensuring that all the nodes receive the public write messages in the same sequence is to ensure that all such messages pass through the same point, referred to herein as the central chronology point (CCP). For example, the public write messages may be broadcast over a star network, with a central coupler which serves as the CCP for the system.

A problem with a star network, however, is that it is not easily extendible to add more nodes to the system. Moreover, it is not easily reconfigurable in the event of failure of the central coupler.

The object of the invention is to provide a novel form of network for interconnecting processing nodes which overcomes these problems.

SUMMARY OF THE INVENTION

According to the invention there is provided a data processing system comprising: a network comprising a first leg, a second leg, and a loopback connection connecting the first leg to the second leg, and a plurality of processing nodes each having an output connected to the first leg of the network for sending messages onto the network, and an input connected to the second leg of the network for receiving messages from the network.

It can be seen that in this system, messages from the outputs of all the nodes pass up one leg of this network, and are then looped back down the other leg of the network to the inputs of all the nodes. The loopback connection thus acts as the central chronology point for the system. As will be shown, such a system can easily be extended or reconfigured.

DESCRIPTION OF AN EMBODIMENT OF THE INVENTION

One embodiment of the invention will now be described by way of example with reference to the accompanying drawings.

System overview

Figure 1:
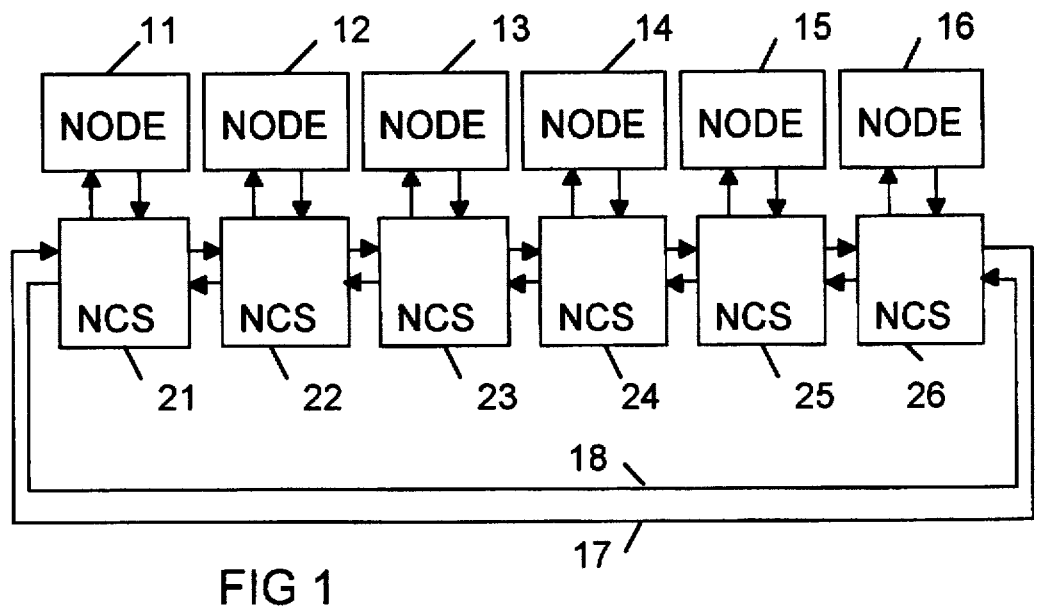
FIG. 1 is a block diagram of a multi-node data processing system in accordance with the invention.

Referring to FIG. 1, this shows a multi-node data processing system comprising a plurality of data processing nodes 11–16. Each node includes a local memory (not shown) for holding a local copy of shared public data. The internal structure of each node forms no part of the present invention and so will not be described any further herein.

The nodes are connected in a network, comprising two rings 17,18, by means of respective node connection switches (NCS) 21–26. The network is used to broadcast public write messages, requesting each recipient to update its local copy of the public data.

Figure 2:
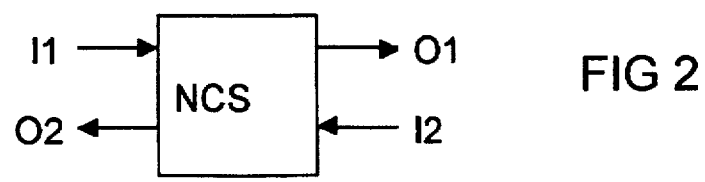
FIG. 2 is a diagram showing the connections to a node switching unit (NCS).

As shown in FIG. 2, each NCS has first and second inputs I1, I2 and first and second outputs O1 and O2. The first output O1 of each NCS is connected to the first input I1 of the next NCS; conversely, the second output O2 of each NCS is connected to the second input I2 of the preceding NCS. These connections may be either copper connections, or fibre optic connections.

Each NCS has two states: a normal state, and a loopback state. When the NCS is in the normal state, it acts as a through connection, passing messages from input I1 to the output O1, and passing messages from input I2 to output O2.

Conversely, when the NCS is in the loopback state, it breaks this through connection, looping messages from input Ii back to the output O2. In both states, messages from the local node are merged with the incoming messages received at input I1 before being forwarded, and outgoing messages on output are also returned to the local node.

Configuration as a single system

Figure 3:
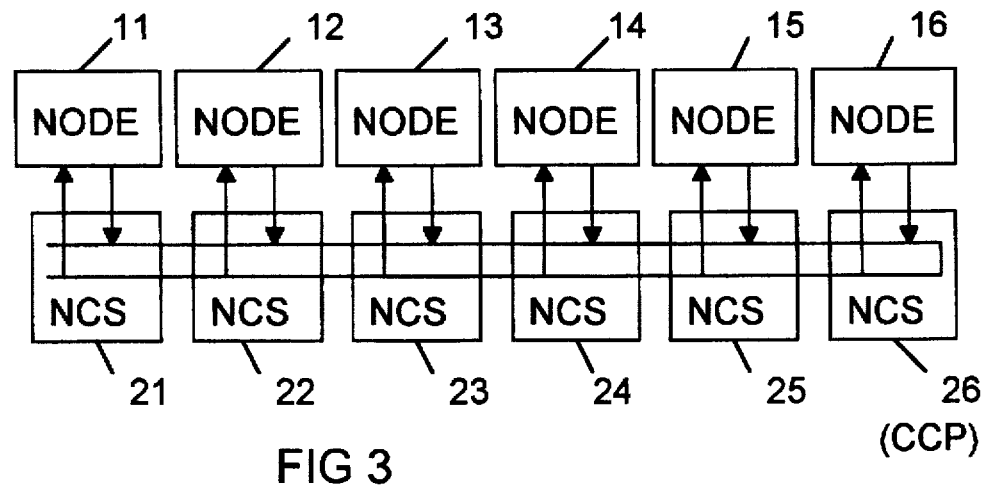
FIG. 3 is a schematic diagram showing one possible configuration of the system.

FIG. 3 shows one way of configuring the NCSs, so that the nodes are all interconnected to form a single system.

In this case, NCSs 21–25 are held in their normal states, and NCS 26 is held in its loopback state. It can be seen that in this case the system is effectively configured as a hairpin shaped network, having two legs interconnected by NCS 26. Messages from the outputs of all the nodes pass up one leg of this network, to NCS 26. The messages are then looped back down the other leg of the network to the data inputs of all the nodes. NCS 26 thus acts as the central chronology point (CCP) for the system: the order in which the messages pass through this point defines a unique chronology for the messages, and all the nodes receive all the messages in this order.

If the NCS that is currently acting as the CCP fails, the system can readily be reconfigured, to make any other NCS the CCP for the system. Moreover, further nodes can easily be added to the system, simply by adding more NCSs into the ring.

Reconfiguration as several sub-systems

Figure 4:
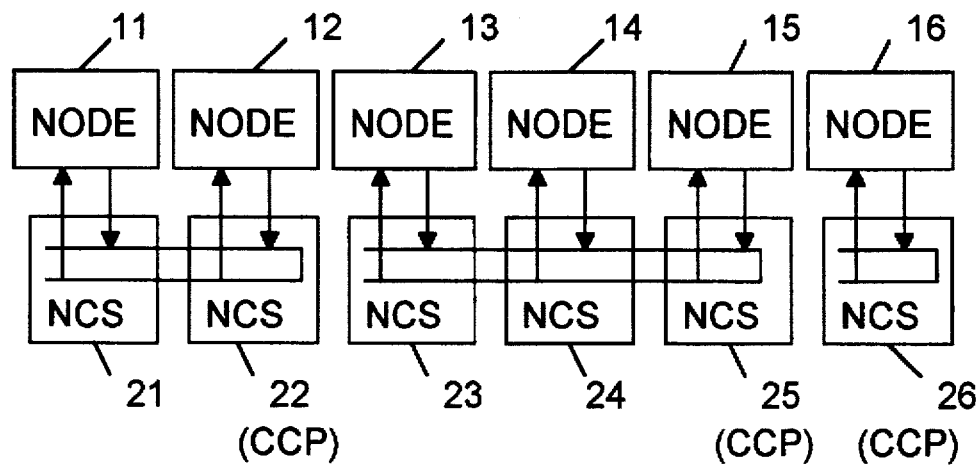
FIG. 4 is a schematic diagram showing another possible configuration of the system.

FIG. 4 shows one way in which the NCSs can be reconfigured, e.g. to avoid one or more broken ring segments.

In this example, NCSs 21, 23, and 24 are in the normal state while NCSs 22, 25 and 26 are in the loopback state. It can be seen that in this case the system is configured into three sub-systems, the first comprising nodes 11 and 12, the second comprising nodes 13 to 15, and the third comprising node 16. The first subsystem has NCS 22 as its CCP, while the second subsystem has NCS 25 as its CCP.

The system can be reconfigured into sub-systems in many different ways, the only restriction being that each sub-system may only contain nodes that are adjacent to each other.

Node Connection Switch (NCS)

Figure 5:
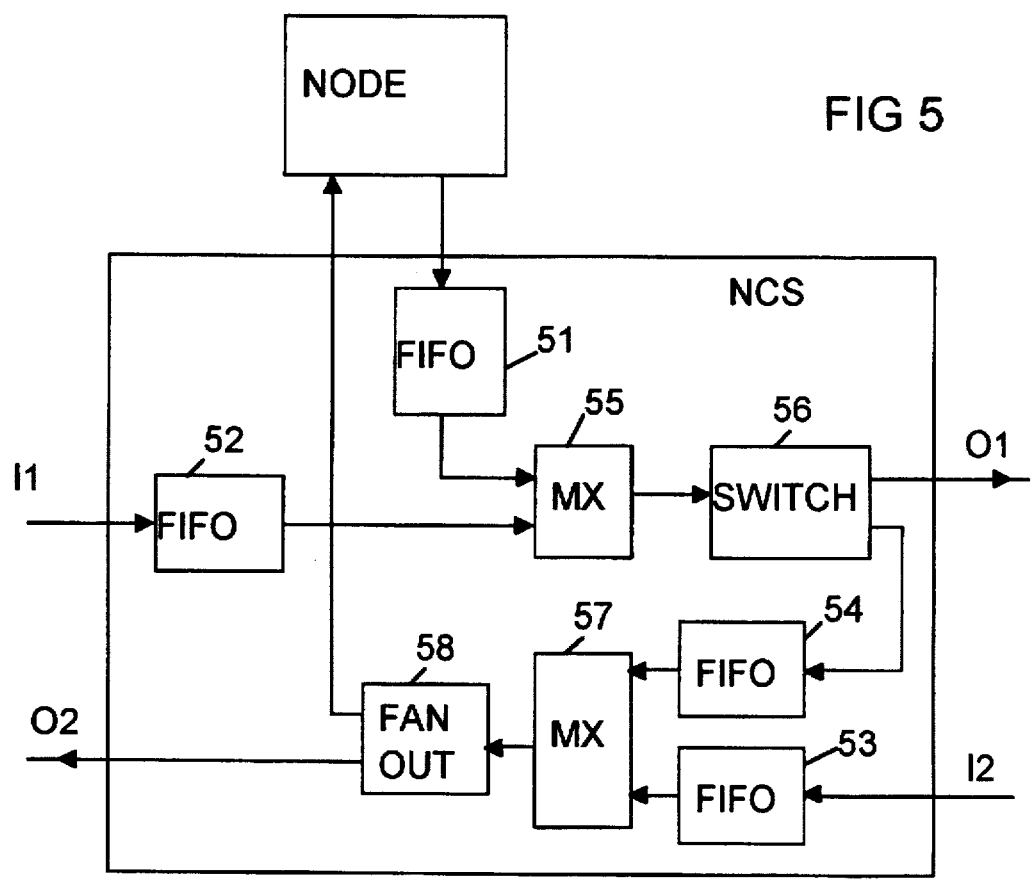
FIG. 5 is a block diagram of a node switching unit (NCS).

FIG. 5 shows one of the NCSs in more detail.

The NCS includes four first-in first-out (FIFO) buffers 51–54. FIFO 51 is connected to the data output of the associated processing node, and receives a queue of messages from the node, for broadcasting over the network. FIFO 52 is connected to the input I1, and receives a queue of messages forwarded from the preceding NCS in the ring. FIFO 53 is connected to the input I2, and receives a queue of messages forwarded from the next NCS in the ring.

The outputs of the FIFOs 51 and 52 are connected to the inputs of a 2-way multiplexer 55, which selects and merges the messages from the local node and from the ring. The output of the multiplexer 55 is fed to the input of a 2-way switch 56. In the normal state of the NCS, this switch is set to direct the messages from the multiplexer 55 to the output O1 of the NCS. In the loopback state, this switch is set to redirect these messages to the input of FIFO 54.

The outputs of the FIFOs 53 and 54 are connected to the inputs of a 2-way multiplexer 57. In the normal state of the NCS, this multiplexer is set to select messages from the FIFO 53. In the loopback state, it is set to select messages from the FIFO 54. The output of the multiplexer 57 is fed to the input of a fan-out circuit 58. One output of the fan-out circuit is connected to the output O2, the other is connected to the data input of the processing node.

Thus it can be seen that when the NCS is in the normal state, it acts as a through connection, passing messages from input I1 to the output O1, and passing messages from input I2 to output O2. Conversely, when the NCS is in the loopback state, it breaks this through connection, looping messages from input I1 back to the output O2. In both states, messages from the local node are merged with the incoming messages received at input I1 before being forwarded, and outgoing messages on output O1 are also returned to the local node.

Performance

The performance of the system is governed by the size of the FIFOs, the bandwidth of the interconnections, and the distance between the nodes.

The system is fully scalable, each extra node added to the network having its own NCS. Assuming that the bandwidth of the interconnections is sufficiently high, there will be no significant degradation in performance with the addition of further nodes to the network.

Because the system is unbalanced (i.e. the nearer the node is to the CCP the smaller its latency), nodes will show different performances. However, for locally connected systems (i.e. those where the maximum distance between nodes is less than 200 meters), these differences will be negligible (less than 1%).

Disaster proof systems

Figure 6:
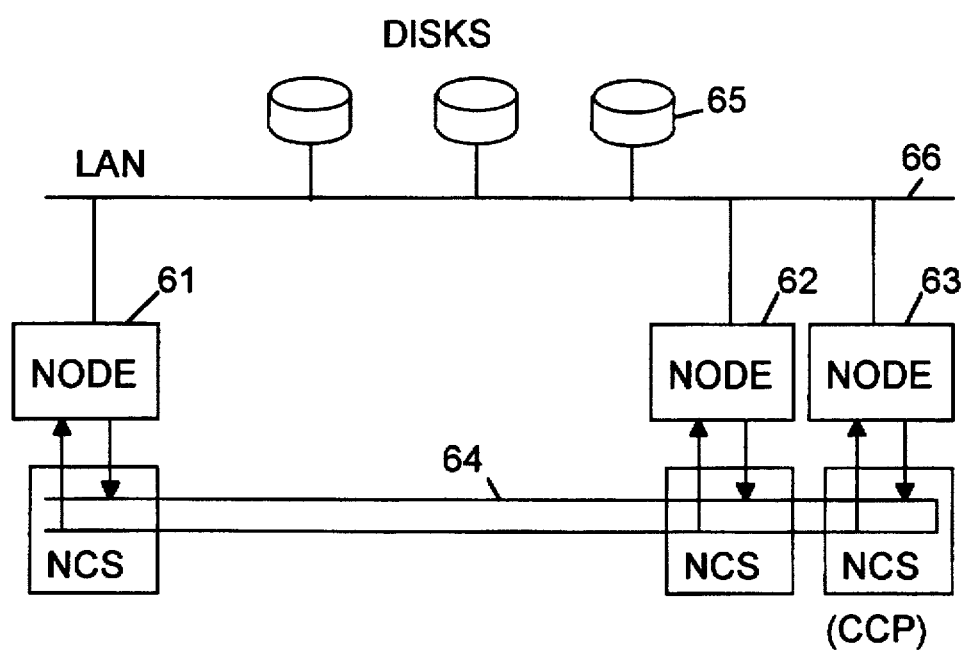
FIG. 6 illustrates the way in which the invention can be used to provide disaster proofing.

FIG. 6 shows an alternative embodiment of the invention.

As before, this system includes a plurality of nodes 61-63, interconnected by a hairpin network 64. The nodes share a number of disks 65, by way of a LAN network 66. In this case, the node 61 furthest from the CCP is a backup node, whose only function is to maintain a consistent copy of the public data, for enabling recovery in the event of a disaster. This backup node is typically situated a very long distance (e.g. 100 kilometers) from the other nodes. Because this backup node is so far from the CCP, its latency is relatively high. However, this does not matter since the backup node is not actually performing any real work. The active nodes, on the other hand, are all close to the CCP, and so their performance is not reduced, no matter how far away the backup node is.

This can be contrasted with balanced systems (e.g. star networks), in which it is not possible to position one of the nodes at a great distance from the CCP, since that would degrade the performance of all the other nodes as well. In other words, the present invention permits realistic disaster proof systems to be built without significant loss of performance.

Conclusion

It will be appreciated that many modifications may be made to the system described above without departing from the scope of the invention.

I claim:

1. A data processing system comprising:
   (a) a generally U-shaped network comprising a first leg, a second leg, and a loopback connection connecting the first leg to the second leg; and
   (b) a plurality of processing nodes each having an output connected to the first leg of the network for sending messages only on to said first leg of the network, towards said loopback connection, and an input connected to the second leg of the network for receiving messages only from said second leg of the network, after said messages have passed through said loopback connection.

2. A data processing system according to claim 1 wherein each processing node holds a local copy of public data shared between all of said nodes, and wherein said messages comprise public write messages for broadcasting to all the nodes, instructing each node to update its local copy of the public data.

3. A data processing system according to claim 1 further including means for reconfiguring said data transmission network to form a plurality of disjoint sub-networks, each of which comprises a first leg, a second leg, and a loopback connection connecting said first leg to said second leg.

4. A data processing system according to claim 1 further including a backup node for disaster recovery, said backup node having an output connected to the first leg of the network for sending messages onto the network, and an input connected to the second leg of the network for receiving messages from the network, said backup node being situated at a distance from said loopback connection substantially greater than the distance between said loopback connection and any of said processing nodes.

5. A method of operating a data processing system comprising a plurality of processing nodes and a generally U-shaped data transmission network comprising a first segment and a second segment, said second segment being connected to said first segment by way of a chronology point, said method comprising the steps:
   (a) operating said processing nodes to transmit messages only on to said first segment of said data transmission network, whereby all of said messages flow from said first segment, through said chronology point, to said second segment; and
   (b) operating said processing nodes to receive said messages only from said second segment, whereby all of said processing nodes receive said messages in a unique chronological order determined by the order in which said messages pass through said chronology point.

6. A method according to claim 5 wherein said messages are public write messages, instructing each processing node to update a local copy of public data, shared between all of said nodes.

7. A method according to claim 5 including the further step of reconfiguring said data transmission network to form a plurality of disjoint sub-networks, each of which comprises a first segment and a second segment, connected to said first segment by way of a chronology point.

* * * * *